(12) United States Patent
Hunter

(10) Patent No.: US 6,430,605 B2
(45) Date of Patent: *Aug. 6, 2002

(54) SYSTEM PERMITTING RETAIL STORES TO PLACE ADVERTISEMENTS ON ROADSIDE ELECTRONIC BILLBOARD DISPLAYS THAT TIE INTO POINT OF PURCHASE DISPLAYS AT STORES

(75) Inventor: Charles Eric Hunter, Hilton Head Island, SC (US)

(73) Assignee: World Theatre, Inc., Morrisville, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,333

(22) Filed: Oct. 12, 1999

Related U.S. Application Data

(63) Continuation-in-part of application No. 09/315,111, filed on May 18, 1999, which is a continuation-in-part of application No. 09/301,102, filed on Apr. 28, 1999.

(51) Int. Cl.[7] .................................................. G06F 9/00
(52) U.S. Cl. ........................ 709/207; 709/217; 709/218; 709/227; 705/26; 705/27
(58) Field of Search ................................. 709/207, 217, 709/218, 219, 227, 234, 238, 240; 705/26, 27

(56) References Cited

U.S. PATENT DOCUMENTS

| | | | | |
|---|---|---|---|---|
| 5,898,384 A | * | 4/1999 | Alt et al. | 340/825.36 |
| 5,934,795 A | * | 8/1999 | Rykowski et al. | 362/309 |
| 5,992,888 A | * | 11/1999 | North et al. | 283/56 |
| 6,073,372 A | * | 6/2000 | Davis | 40/124.16 |

OTHER PUBLICATIONS

Steven A. Morley, "Making Digital Cinema Actually Happen –What It Takes and Who's Going to Do It", *Qualcomm Incorporated*, Oct. 31, 1998.

* cited by examiner

Primary Examiner—Thomas R. Peeso
(74) Attorney, Agent, or Firm—Finnegan, Henderson, Farabow, Garrett & Dunner, LLP.

(57) ABSTRACT

Commercial advertisers, such as a chain of retail stores, directly access a network of thousands of large, high resolution roadside electronic displays and directly send their own advertisements electronically to the network to be displayed at locations and times selected by the advertisers, while tying the advertising content into the content of point of purchase displays in the advertiser's store(s).

59 Claims, 4 Drawing Sheets

HOME BUILDER'S DEPOT
"America's Building Supply Store"

SPECIAL VALUES TODAY AT ALL
TRIANGLE AREA LOCATIONS

| | |
|---|---|
| 2x4's, No. 1 Quality Pine | $5. |
| Grass Seed, 50 lbs. | $30. |
| Toro Riding Lawnmower | $800. |
| Azaleas, Five Gallon | $12. |
| 200 Piece Socket Wrench Kit | $30. |
| Treated Wood Playground Set | $275 |
| PupPlay Doghouse | $45 |

EIGHT TRIANGLE N.C.
LOCATIONS TO SERVE YOU

- (HBD) 215 NORTH STREET
- (HBD) 105 JONES STREET
- DURHAM
- (HBD) HWY 15
- (HBD) 300 CAPITAL STREET
- (HBD) 2500 EAST STREET
- RALEIGH
- (HBD) 250 FLOWER ROAD
- (HBD) 700 SOUTH STREET
- CHAPEL HILL
- (HBD) 522 SMITH STREET

SYSTEM PERMITTING RETAIL STORES TO PLACE ADVERTISEMENTS ON ROADSIDE ELECTRONIC BILLBOARD DISPLAYS THAT TIE INTO POINT OF PURCHASE DISPLAYS AT STORES

CROSS REFERENCE TO RELATED APPLICATIONS

This application is a continuation in part of Ser. No. 09/315,111, filed May 18, 1999, pending which is a continuation in part of Ser. No. 09/301,102, filed Apr. 28, 1999 pending.

FIELD OF THE INVENTION

The invention relates to the display of video or still image content on electronic displays. More particularly, the invention relates to a network of thousands of large, high resolution roadside electronic billboard displays, and an associated system that permits retail stores to place advertisements on the displays while tying the advertisement content into the content of point of purchase displays at their stores.

BACKGROUND OF THE INVENTION

Consumer product advertising takes many forms, such as television commercials, newspaper and magazine advertisements, mailings, point-of-sale displays, outdoor billboards, etc.

Using current advertising media, advertisers engage in a constant struggle to efficiently use their budgets to most effectively reach their geographic and demographic targets.

Focusing on the outdoor advertising component of advertising by consumer product companies, it is well known that outdoor billboards have traditionally taken the form of single-message displays formed of printed sheets or painted surfaces containing the advertising content adhered to a flat backing. This time-honored outdoor advertising technique has remained essentially unchanged throughout the twentieth century. The high cost of printing, transporting and mounting a message on a conventional billboard has dictated that the same message remain in place for a considerable period of time. Thus, a conventional billboard cannot be readily changed to reflect current events within the geographic area of the billboard. Additionally, the content on a conventional billboard tends to become essentially "invisible" as a part of the landscape after its content has been in place for a relatively short period of time, especially to commuters and others who regularly pass the billboard. Beyond the above problems with cost, single-message content, lack of content changeover capability, and the like, conventional outdoor billboards have come under increasing criticism because in their large numbers, and often tattered condition, they clutter highways with a distasteful form of visual "pollution". A reduction in the number of billboards and improvement of the appearance and profitability of those that remain, if accomplished while increasing the overall advertising impact afforded by outdoor advertising, would please virtually everyone.

The use of electronic billboards has been suggested, for example, in U.S. Pat. No. 5,612,741. However, there is no electronic billboard network in operation whereby commercial advertisers may directly place ads onto selected billboards at selected times through direct access to a master network. Such a network, properly designed and operated, promises to overcome the numerous disadvantages currently associated with the outdoor advertising industry, while also meeting the above needs of consumer products advertisers.

Turning now to point of purchase advertising, it is well known that various retail stores such as department stores, fast food restaurants, building supply stores, and the like, utilize point of purchase displays to inform customers of product specifications and pricing and to promote periodic special value or "sale" items. These point of purchase displays usually take the form of inexpensive paper product displays that are mounted adjacent to products being promoted, or displays located in a general store location (such as the entrance) to communicate more general information to consumers. Other forms of point of purchase displays may be used, such as electronic displays, for example, displays utilizing "electronic ink" technology. Current product advertising techniques do not effectively tie point of purchase displays to other forms of advertising, particularly to outdoor advertising.

SUMMARY OF THE INVENTION

The present invention, in one broad aspect, is a system that permits a commercial advertiser with retail store(s) to place video or still-image advertisements at selected times on a network of multiple roadside electronic displays, and to tie the roadside advertisements into point of purchase displays at the advertiser's retail stores.

Commercial advertisers, such as retail store chains and the advertising agents that represent them, directly access a network of multiple, large, high resolution electronic displays located in high traffic areas and directly send their own advertisements electronically to the network to be displayed at locations and times selected by the advertisers. In preferred embodiments, this implementation of the invention includes a central information processing center that permits customers to review a schedule of times and electronic display locations that are available for placement of advertisements, and also permits customers to purchase available times at selected electronic display locations for placement of their advertising content. The customer then transmits his video or still image advertising content to the processing center where the content is reviewed for appropriateness and then transmitted to the customer-selected electronic display(s). The electronic displays preferably are large (e.g., 23×33½ ft.) flat LED displays that are driven by their own video or image servers. In conjunction with the placement of advertisements on the roadside electronic displays (billboards), the advertiser also provides point of purchase displays at each retail store with content that ties into the roadside advertisements. For example, both the roadside advertisement and the point of purchase displays may focus on specific special value or "sale" items, with the point of purchase displays repeating the sale information and directing customers to the store location(s) where the sale items may be found. The point of purchase displays may be electronic displays, most preferably displays employing electronic ink technology. Electronic point of purchase displays may be incorporated into the same network as the roadside electronic displays or they may be operated by a private network controlled by the commercial advertiser who owns the retail stores.

BRIEF DESCRIPTION OF THE DRAWINGS

Some of the features of the invention having been stated, other features will appear as the description proceeds, when taken in connection with the accompanying drawings, in which

FIG. 3A is a view of a roadside electronic display of the network that is displaying special value items that are being offered at a retailer's area stores, as well as a map and street address information useful to locate the stores.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
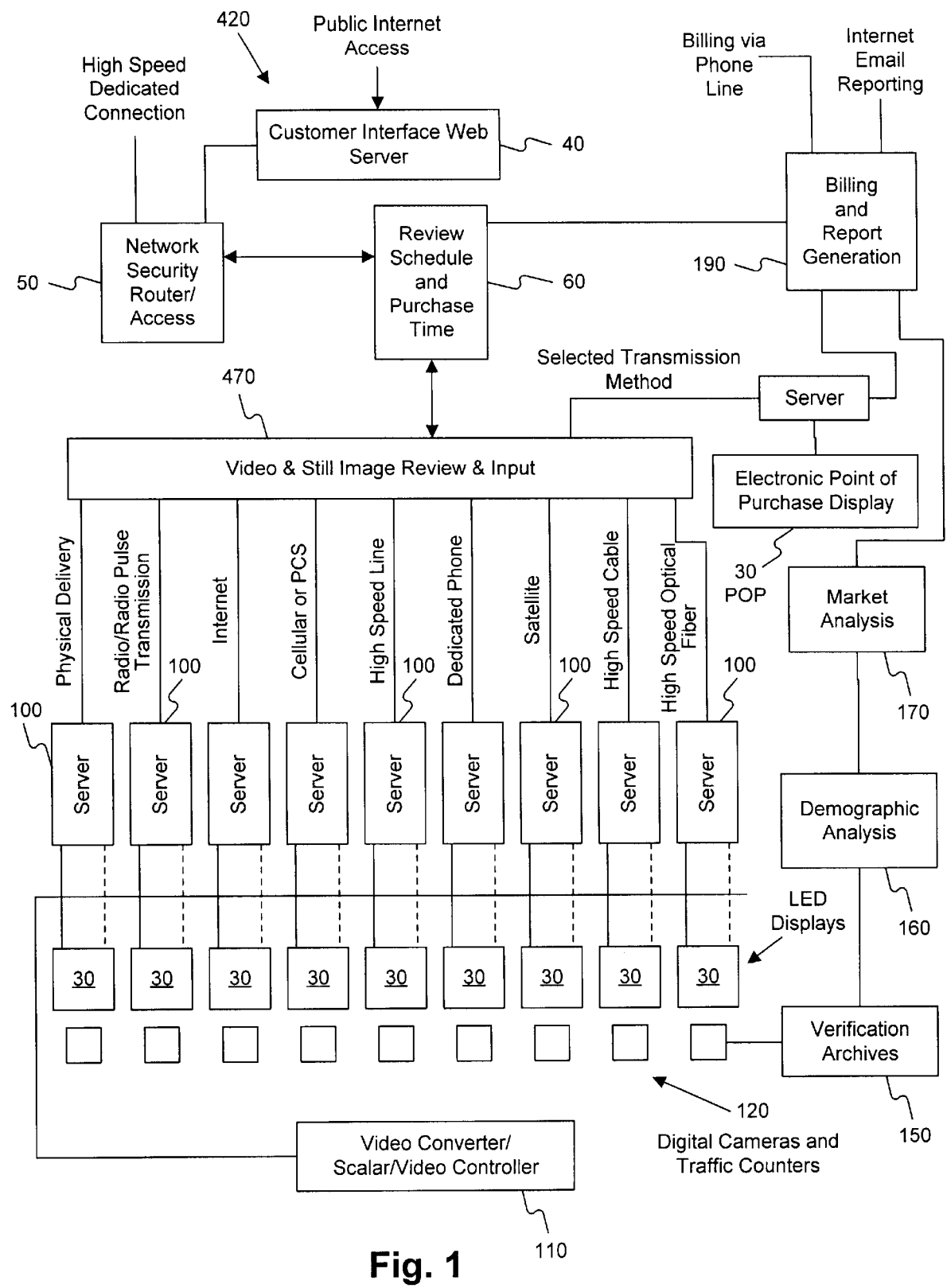
FIG. 1 is a block diagram showing the principal components of a system constructed in accordance with the present invention for advertising purposes.

Referring to the drawings, and particularly to FIG. 1, there is shown a block diagram of a system 20 for direct placement of commercial advertisements, public service announcements and other content on electronic displays. System 20 includes a network comprising a plurality of electronic displays 30 that are located in high traffic areas in various geographic locations. The displays may be located in areas of high vehicular traffic, and also at indoor and outdoor locations of high pedestrian traffic, as well as in movie theaters, restaurants, sports arenas, casinos or other suitable locations. Thousands of displays, up to 10,000 or more displays worldwide, may be networked according to the present invention. In preferred embodiments, each display is a large (for example, 23 feet by 33½ feet), high resolution, full color display that provides brilliant light emission from a flat panel screen.

A customer of system 20, for example an in-house or agency representative of a consumer products company, may access a central information processing station of the system via the Internet through a customer Interface Web Server 40. The customer interface web server has a commerce engine and permits the customer to obtain and enter security code and billing code information into a Network Security Router/Access module 50. Alternatively, high usage customers of the system may utilize a customer interface comprising a high speed dedicated connection to module 50. Following access, the customer reviews options concerning his order by reviewing available advertising time/locations through a Review Schedule and Purchase Time module 60 that permits the customer to see what time is available on any display throughout the world and thereafter schedule and purchase the desired advertising time slot. Next, the customer transmits the advertising content on-line through the Internet, a direct phone line or a high speed connection (for example, ISDN, or other suitable high speed information transfer line) for receipt by the system's Video & Still Image Review and Input module 70. In parallel, the system operator may provide public service announcements and other content to module 70. All content, whether still image or video, is formatted in NTSC, PAL, SECAM, YUV, YC, VGA or other suitable formats. In a preferred embodiment, the format is VGA, while all other formats, including but not limited to NTSC, PAL and SECAM, can be run through the video converter 110.

The video & still image review and input module 70 permits a system security employee to conduct a content review to assure that all content meets the security and appropriateness standards established by the system, prior to the content being read to the server 100 associated with each display 30 where the content being transmitted to the server 100 will be displayed. Preferably, the servers are located at their respective displays and each has a backup. An example of a suitable server is the IBM RISC 6000 server.

The means for transmitting content information to the display locations may take a number of forms, with it being understood that any form, or combination thereof, may be utilized at various locations within the network. As shown in FIG. 1, the means include:

a. High speed cable
b. Satellite
c. Dedicated phone
d. High speed line (e.g., ISDN, ADSL)
e. Cellular, PCS or other data transmission at available frequencies
f. Internet
g. Radio/radio pulse transmission
h. High speed optical fiber
i. Physical delivery of digitally stored information medium.

A video converter/scaler function and a video controller function provided by module 110 may be utilized in connection with those servers 100 and associated displays 30 that require them, according to data transmission and required reformatting practices well known in the art.

Verification that advertisements do, in fact, run at the intended time at the intended displays may be provided by an information storage module (not shown) linked to each display. Another form of verification may be achieved by a Digital Camera and Traffic Count Recorder 120 that continuously records the content appearing at its respective display 30 and digitally transmits video verification information to a Verification Archives module 150. Recorder 120 also provides traffic count information (for example, 225 vehicles passed the display while an advertisement ran) to verification archives module 150.

Information from verification archives module 150 is utilized by a demographic analysis module 160 and a market analysis module 170 to generate information for reports to be sent to customers after their advertisements run. To this end, analysis data from modules 160 and 170 is transmitted to a Billing and Report Generation module 190 where reports are assembled showing, for example, the time of the advertisement, the content of the advertisement, the traffic count and residence/median income information about those who saw the advertisement. A representative, simplified report for an advertisement running on a single display is as follows:

| | |
|---|---|
| Customer: | ABC Cola Co. |
| Ad Content: | Ocean Scene with graphics (content code 1111) |
| Location: | Atlanta, Georgia, Interstate 75N, milepost 125 (site code XXXX) |

-continued

| | |
|---|---|
| Time: | 7:30 AM, June 30, 2000 |
| Vehicle Count: | 225 |
| Viewer Count: | 340 |
| Viewer Demographics: | 50% Resident Cobb County, GA Median household income: $60,000/yr. 30% Resident DeKalb County, GA Median household income: $52,000/yr. 20% Median household income $55,000/yr. |
| Advertising Cost: | $X |

For an advertisement that may have run at multiple displays, for example 100 displays, a representative report may appear as follows:

| | |
|---|---|
| Customer: | ABC Cola Co. |
| Ad Content: | Mountain Scene with graphics (content code 2222) |
| Locations: | 100 sites (site codes YYY....ZZZ) |
| Time: | 8:30 AM, July 10, 2000 |
| Total Vehicle Count: | 21,500 |
| Total Viewer Count: | 37,200 |
| Viewer Demographics: | Median household income, $49,500 |
| Advertising Cost: | $Y |

Module 190 also produces bills that may be transmitted by phone lines for a debit payment such as a direct bank draft, or other suitable payment mode.

Figure 2:
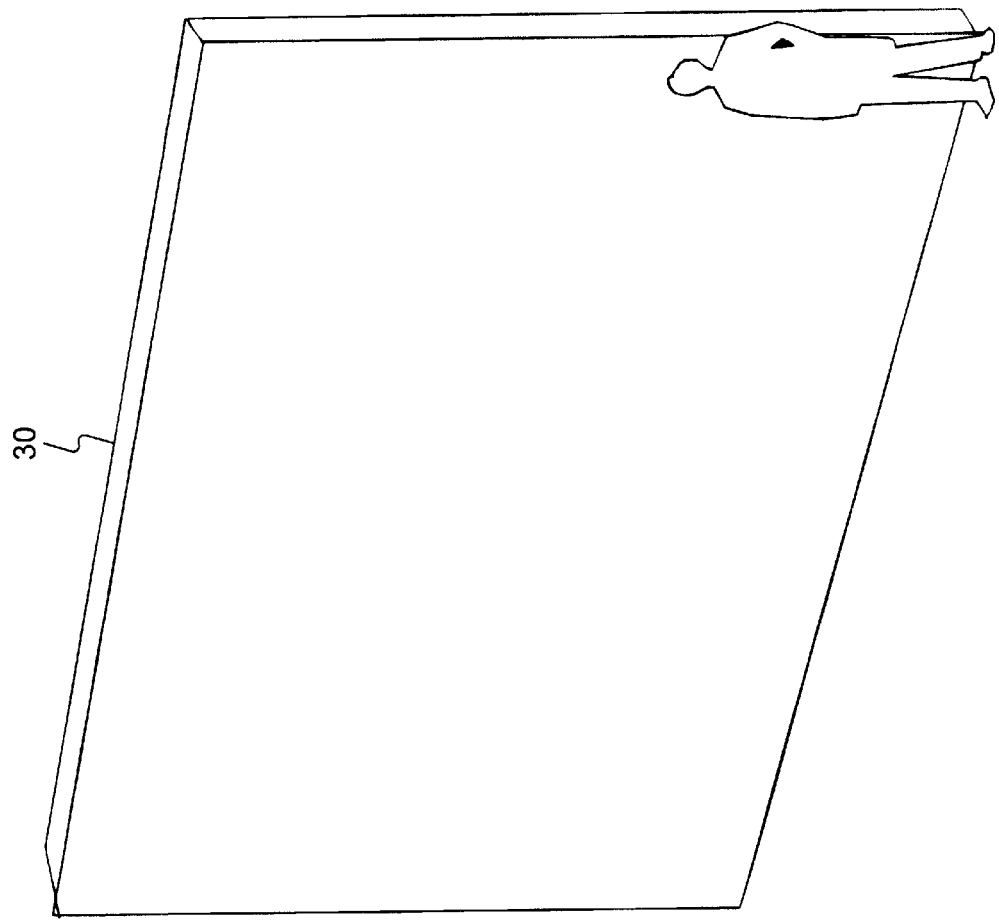
FIG. 2 is a view of one of the electronic displays of the network of FIG. 1.
Figure 2:
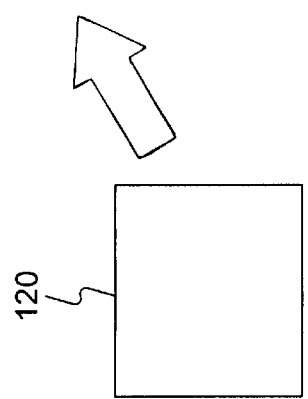

Referring to FIG. 2, there is shown a pictorial view of one preferred form for the electronic displays 30. In this embodiment, display 30 takes the form of a 23 feet by 33½ feet seamless flat screen display including multiple flat panel display modules. The panels utilize advanced semiconductor technology to provide high resolution, full color images utilizing light emitting diodes (LED's) with very high optical power (1.5–10 milliwatts or greater) that are aligned in an integrated array with each pixel having a red, green and blue LED. It will be appreciated that multiple LED's of a given color may be used at pixels to produce the desired light output; for example, three 1.5 milliwatt blue LED's may be used to produce a 4.5 milliwatt blue light output. Each red, green and blue emitter is accessed with 24 bit resolution, providing 16.7 million colors for every pixel. An overall display of 23 feet by 33½ feet, so constructed, has a high spatial resolution defined by approximately 172,000 pixels at an optical power that is easily viewable in bright sunlight. Suitable display modules for displays 30 are manufactured by Lighthouse Technologies of Hong Kong, China, under Model No. LV50 that utilize, for blue and green, InGaN LED's fabricated on single crystalline $Al_2O_3$ (sapphire) substrates with a suitable buffer layer such as AlN and, for red, superbright AlInGaP LED's fabricated on a suitable substrate such as GaP. These panels have a useful life in excess of 50,000 hours, for example, an expected life under the usage contemplated for network 20 of 150,000 hours and more. In preferred embodiments, the panels are cooled from the back of the displays, preferably via a refrigerant-based air conditioning system (not shown) such as a forced air system or a thermal convection or conduction system. Non refrigerant-based options may be used in locations where they produce satisfactory cooling. The displays preferably have a very wide viewing angle, for example, 160°.

While the Lighthouse Technologies displays utilize the InGaN on sapphire and AlInGaP on GaP LED's described above (and in certain cases InGaN on SiC), other materials may be used for the LED's as follows:

1. (Blue/green) InGaN on SiC, preferably with a suitable buffer layer such as AlN
2. (Blue/green) InGaN on GaN
3. (Blue/green) InGaN on AlN, preferably with a suitable buffer layer such as AlN.
4. (Blue/green) AlN or AlN-containing compound on AlN, sapphire or SiC.

It will be appreciated that the InGaN on sapphire and the other solid state LED's described above have substrates with high optical transmissivity and produce very high optical power.

This is important for a number of reasons, including giving the electronic display designers the ability to create very wide viewing angles up to approximately 160°, and the resultant increase in visibility of the displays to viewers in oncoming traffic.

In addition to the particular solid state LED's mentioned above, the discrete sources of blue, green and red light at each pixel may take other forms such as composite devices including an ultraviolet LED that is utilized to excite a phosphor that, in turn, produces light of a selected spectrum. The ultraviolet LED may be formed from a GaN or GaN-containing compound on sapphire with or without suitable buffer layer, or a GaN or GaN-containing compound on SiC, preferably with a suitable buffer layer, or an AlN or AlN-containing compound on AlN, sapphire, SiC or GaN, with or without a suitable buffer layer. In one embodiment, ultraviolet LED's are incorporated into three different composite devices, each with a different phosphor for producing blue, green and red, respectively. In another embodiment, a phosphor is selected to produce white light and a desired color is produced by passing the white light through a band pass filter. According to this white light embodiment, filters of blue, green and red may be used to create discrete composite devices that produce blue, green and red light at each pixel. The use of white light with appropriate band pass filters has the advantage of producing a colored light with an excellent wave length distribution that will not change appreciably over time, a desirable property for color balancing. On the other hand, the use of three different phosphors to directly produce blue, green and red without a filter has the advantage of higher efficiency because light is not filtered out. Both approaches have the advantage of excellent persistence which, as known in the art, is a desirable feature that is especially important in video applications, particularly digital movie theater applications that are discussed in detail below.

It will be appreciated that energy sources other than ultraviolet LED's may be used to excite the phosphors of the composite devices discussed immediately above.

In the case of low ambient light applications, such as digital movie theaters, lower power LED's may be used. Furthermore, higher power LED's may be used to provide a light source for an LCD shutter-type screen as described in U.S. Pat. No. 5,724,062, incorporated herein by reference.

The provision of one or more high resolution, highly aligned digital cameras at each display site, for example the camera or cameras utilized in digital camera and traffic counter 120, or other specifically dedicated cameras, provides a means permitting in situ diagnostics and calibration of the displays. As known in the art, certain digital cameras have a resolution of over 7,000,000 pixels—as compared to approximately 172,000 pixels on the above-described 23×33½ ft. display. Thus, by directing a digital camera at a display, or directing multiple digital cameras at different discrete portions of a display, a correspondence may be attained where a portion of each digital camera's image corresponds to a single pixel in the display. Suitable means for aligning the digital camera with the display is used, for example, optical means such as laser alignment marks. At selected times set aside for diagnostics and calibration, such as a five minute period each night, the entire display may be run red, then green, then blue, followed by white, all at multiple power levels. In order to reduce interference, the LED's may be switched on individually for a short period, for example one millisecond each. In the most basic diagnostic operation carried out when the display is run red/green/blue, the camera(s), mounted at a selected distance from the display such as sixty feet away, are capable of detecting nonfunctioning or excessively degraded LED's for replacement.

Beyond replacing defective LED's, each night the system may automatically re-calibrate all LED's in the display. To this end, the display is run red/green/blue at several iterative power levels (e.g., 20%/40%/60%/80%/100%) and the optical power output of each LED is sensed for each power level, with the goal being to calibrate the system so that each red, green or blue LED has the same optical power output at each power level as do the other LED's of the same color. Calibration preferably is achieved by diode recalibration scaler software (e.g., look up table) that may be associated with a scaler (not shown) that acts independently in conjunction with the video converter/scaler at 110 (FIG. 1). The diode recalibration scaler receives information from the diagnostic equipment indicating the optical power output of each LED at the various power levels and, through an associated automatic calibration LED look-up table, accounts for daily variance in LED output (degradation or increase) by adjusting the power curve by which the LED will be driven the next day. This periodic (e.g. daily) in situ recalibration has the benefit of greatly reducing on site maintenance since LED's that have degraded can be run harder to compensate for the degradation, eliminating the need for frequent replacement.

As an alternative to using digital cameras for the diagnostic and calibration function, in other embodiments miniature photodetector chips, with or without band pass filters, may be located in close proximity to each LED in the display for measuring LED light output during diagnostic/calibration operations.

As another alternative, a programmable chip may be located at each pixel so that each individual chip may be reprogrammed as necessary during each calibration sequence to raise or lower the effective light output of the LED's contained in the pixel.

As an alternative to performing daily in situ calibration by looking at every pixel in sequence and adjusting the scaling value for each pixel, a statistical modeling approach may be utilized. According to this approach, selected LED's or groups of LED's may be run in iterative power cycles in order to optimize the overall screen color through statistical analysis to provide a new scaling value for each LED or group of LED's.

When the diagnostic operation operates with an all white display, the three LED's at each pixel may be evaluated individually and collectively to assure that the pixel is contributing the proper spectrum and amount of white light. Through a diagnostic/calibration software package that interrelates output and peak wave length response for each red/green/blue LED at a pixel to the desired white light response, an iterative calibration may be undertaken at each pixel to adjust the values contained in the diode recalibration scaler software or to reprogram programmable logic chips that determine the drive current for each LED located in a specific pixel.

It will be appreciated that split screen images may be displayed at the displays 30. In the simplest application, a still image advertisement may be one half corporate logo and one half scenery. Beyond this simple application, split screen capability may be used to present a portion of the image as a corporate logo, or the like, and the remainder either real time (or near real time) video or still frame. For example, a previously qualified customer with acceptable internal content review procedures may have direct access to a display or displays for the purpose of displaying a real time (or near real time) sports event, news event, or the like, in conjunction with the customer's corporate logo. This display may be achieved by utilizing high speed servers 100 or by bypassing the servers altogether. High speed still image or video transfer may be facilitated by compression techniques such as JPEG and MPEG II, known in the art.

While advertising scheduling and purchasing may take place as described above where customers directly purchase time from available slots according to a fixed fee schedule, it will be appreciated that alternative modes may be used. For example, an auction system such as introduced by eBay Corporation may be used where all previously purchased slots and all unsold slots are auctioned through a bid process (a "total" auction). Additionally, a limited auction may be utilized where time may be purchased and booked for a set price, but all time not purchased at the set price becomes available through auction at a fixed time before the run time, for example, one month before run time. As another alternative for a portion of the available time slots, a high usage customer may establish a monthly advertising budget with the system operator that authorizes the operator to select the time slots for display of the customer's advertisements at "best available rate" pricing, taking advantage of last minute availability of time slots and other time slot placement techniques that enable the operator to more completely utilize the network. This or similar time slot placement practices when used for a portion of the available time slots may be implemented by a software package that takes into account the needs of both the customer and the system operator.

It will be appreciated that advertising content information may be transmitted to the electronic display locations by physically delivering a suitable information storage device such as CD ROM, zip drive, DVD ROM or DVD RAM. This approach may be utilized to transmit information to displays at any desired location, for example, to remote locations, to movie theaters, etc.

Figure 3B:
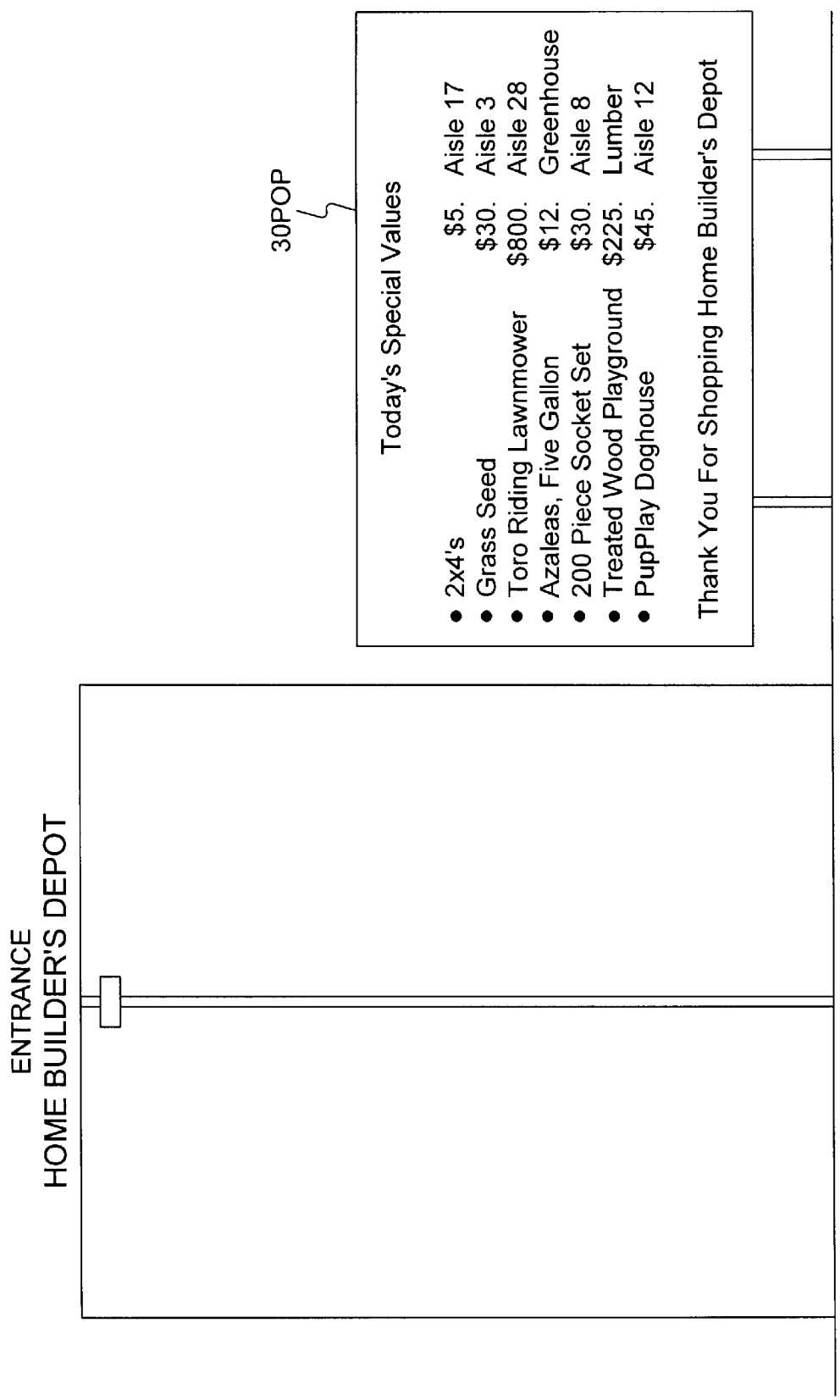
FIG. 3B shows the entrance to one of the area stores of the retailer who placed the roadside advertisement shown in FIG. 3A, and also shows a point of purchase display next to the entrance. The content of the point of purchase display ties into the content of the roadside advertisement.

Referring to FIGS. 3A and 3B, there is shown another implementation of the invention wherein electronic displays 30 in the form of electronic billboards adjacent roadways are used in conjunction with point of purchase displays 30POP that are located in retail stores. According to this implementation of the invention, an advertiser, such as a chain of retail stores, may place advertisements on selected roadside displays 30 in particular geographic location(s) to inform consumers of special value or promotional items at the advertiser's place(s) of business. In the example illustrated in FIGS. 3A and 3B, the advertiser, "Home Building Depot", places advertisements through system 20 at selected times and on a selected number of roadway-adjacent electronic displays 30 (only one shown) informing consumers that certain items are on sale at the company's area stores. In this case, 2×4's are $5.00, grass seed in fifty-pound bags is $30.00, a Toro riding lawn mower is $800.00, etc. The advertisement at roadway-adjacent displays 30 may also give the location(s) of the company's local stores by street address, by map location, or both. In conjunction with this highway-adjacent billboard advertising, the advertiser, Home Building Depot, utilizes point of purchase displays at the area stores to tie into the billboard advertisement, for example, by repeating the special sale items and prices and directing the customers to the store aisles where the particular products may be found. In preferred embodiments, the point of purchase displays 30POP take the form of electronic displays, for example electronic ink displays produced under the IMMEDIA brand by E-Ink Corporation of Cambridge, Mass., USA. The electronic ink displays will hold text for an extended period of time without consuming power and the message can be changed virtually instantly to a new message. In certain embodiments, the format and content of displays 30POP (whether electronic or otherwise) may be controlled by each store without direct input from the other stores or the company's headquarters, other than to assure that the point of purchase displays 30POP are coordinated with the company's roadway advertisements implemented through system 20. In more preferred embodiments, the format and content of displays 30POP are controlled by the same person(s) who places the roadside billboard advertisements through system 20. Preferably, this coordination of content between the roadway-adjacent displays 30 and the point of purchase displays 30POP is achieved by utilizing electronic displays 30POP whose format and content is controlled through a network from a personal computer. This control may be achieved through system 20, in which case displays 30POP are part of the network of electronic displays (FIG. 1), with data transmission being carried out as described above. In this regard, because of the small amount of information needed for communicating a simple message for certain types of electronic point of purchase displays 30POP, a satellite paging communications system may be used to transmit data to displays 30POP. Alternatively, each retailer that uses system 20 for its roadside sign advertising may connect its displays 30POP through the Internet, a private intranet or other suitable means.

While the present invention has been described with reference to specific embodiments, it will be appreciated that modifications may be made without departing from the true spirit and scope of the invention. For example, the roadside or other electronic displays 30 may take any suitable form that provides the resolution, brightness and other image properties necessary for a particular application, such as the use of the above-mentioned electronic ink displays. This and other modifications are deemed to be within the scope of the invention.

I claim:

1. A system permitting a commercial advertiser with retail stores to place video or still-image advertisements at selected times and locations on a network of multiple electronic roadside displays, and to tie the roadside advertisements into point of purchase displays at the advertiser's retail stores, said system comprising:
    a network including a plurality of roadside electronic displays;
    means permitting a commercial advertiser with retail stores to place video or still-image advertisements at selected times on selected ones of the network's roadside electronic displays; and
    point of purchase displays at selected ones of the commercial advertiser's retail stores displaying content that ties into the content of the video or still-image advertisements run on the roadside electronic displays.

2. The system of claim 1 wherein said means permitting a commercial advertiser to place advertisements includes a central processing station that permits a commercial advertiser to transmit its advertising content to the station from which it is routed for display at the customer-selected roadside electronic displays.

3. The system of claim 2 wherein the point of purchase displays at selected ones of the commercial advertiser's retail stores are electronic point of purchase displays, said network of electronic displays includes the point of purchase displays and the content of the point of purchase displays is transmitted by the advertiser through said central processing station.

4. The system of claim 1 wherein the point of purchase displays at selected ones of the commercial advertiser's retail stores are electronic point of purchase displays.

5. The system of claim 4 wherein said electronic point of purchase displays comprise electronic ink displays.

6. The system of claim 4 wherein the electronic point of purchase displays are part of a network of point of purchase displays in multiple stores, said network being independent of said roadside electronic display network and controlled by the commercial advertiser.

7. The system of claim 1 wherein the roadside advertisements display information concerning special value or promotional items for sale at the advertiser's retail stores and the point of purchase displays repeat the special value or promotional sale information.

8. The system of claim 1 wherein the roadside advertisements include information concerning the locations of area stores of the commercial advertiser.

9. A method permitting a commercial advertiser with retail stores to place video or still-image advertisements at selected times and locations on a network of multiple electronic roadside displays, and to tie the roadside advertisements into point of purchase displays at the advertiser's retail stores, said method comprising:
    permitting a commercial advertiser with retail stores to place video or still-image advertisements at selected times on selected roadside electronic displays; and
    providing point of purchase displays at selected ones of the commercial advertiser's retail stores displaying content that ties into the content of the video or still-image advertisements run on the roadside electronic displays.

10. A system for presenting video or still-image content at selected times and locations on a networked connection of multiple electronic displays, said system comprising:
    a network interconnecting a plurality of electronic displays provided at various locations, and a plurality of point of purchase displays provided at places of business;
    means enabling said business to schedule presentation of video or still-image content at selected time slots on selected electronic displays of said network, said means receiving said video or still-image content from a content provider; and
    transmission means in communication with said receiving means for communicating scheduled content to server devices, a server device associated with a selected electronic display of said network for initiating display of said video or still-image content at a selected time on a selected display of said network, a server device additionally coordinating display of content associated with the video or still-image content presented on the selected electronic displays at point of purchase displays located at a selected businesses.

11. The system of claim 10, further including a central processing server for scheduling and for receiving said video or still-image content from said content provider, said central processing server initiating communication of said video or still-image content at the selected electronic displays at the selected times.

12. The system of claim 11, wherein the point of purchase displays at selected ones of the places of business are electronic point of purchase displays, said network of electronic displays including the point of purchase displays and the content of the point of purchase displays is transmitted by the content provider through said central processing server.

13. The system of claim 10, wherein the point of purchase displays at selected ones of the places of business are electronic point of purchase displays.

14. The system of claim 13, wherein said electronic point of purchase displays comprise electronic ink displays.

15. The system of claim 13, wherein said network comprises a first network comprising said plurality of electronic displays provided at various locations, and a second network comprising a plurality of point of purchase displays located at one or more places of business, said first and second networks capable of being controlled by an agent of said business.

16. The system of claim 10, wherein the content for display includes advertisements directed to special value or promotional items for sale at the places of business, said point of purchase displays receiving a separate transmission for repeating the special value or promotional sale information.

17. The system of claim 16, wherein the displayed advertisements include information content providing locations of the places of business.

18. The system of claim 11, wherein a content provider includes an agent of said business, said central processing server comprises means for enabling said agent to view and schedule of times and electronic display locations that are available for placement said content, and additionally enabling said agent to purchase one or more available time slots at selected electronic display locations for presenting said content.

19. The system of claim 18, further comprising means in connection with said central processing server for enabling a review of received transmitted video or still image content prior to transmission to the selected electronic display, said content being transmitted to said selected electronic display upon reviewer approval of said content.

20. The system of claim 11, wherein said content includes one or more of public service announcements, news, or sporting events.

21. The system of claim 18, further including an interface server device for providing Internet access to said central processing server and enabling remote viewing, scheduling and purchasing from remote locations.

22. The system of claim 21, further including a security device for enabling said agent to obtain and enter security code and billing code information to identify said agent prior to accessing said system.

23. The system of claim 22, further including dedicated high-speed connection to said security device for enabling high-usage agents to access the system.

24. The system of claim 11, wherein said content is transmitted to said central processing server according to a mechanism selected from the group comprising: on-line through the Internet, a direct phone line, and, a high speed information transfer line.

25. The system of claim 11, wherein said still image or video advertising content is formatted according to one format selected from the group comprising: NTSC, PAL, SECAM, YUV, YC, and VGA.

26. The system of claim 19, further including one or more high speed server devices associated with each electronic display providing functionality for driving said electronic displays, said content being transmitted to a server device associated with a selected display upon approval of said content to be displayed.

27. The system of claim 26, wherein said transmission means is selected from the group comprising: high speed cable, a satellite link, a dedicated phone connection, a high-speed communications line, a cellular or PCS data transmission device, the Internet, a radio or radio pulse transmission device, a high speed optical fiber, and physical delivery of a medium storing said content.

28. The system of claim 27, wherein said medium storing said content includes one of CD ROM, zip drive, DVD ROM or DVD RAM.

29. The system of claim 27, further including a video converter/scaler mechanism associated with said high speed server devices for each display, said video converter/scaler mechanism enabling any required reformatting of said content according to said transmission means implemented.

30. The system of claim 26, further including:
means linked to each electronic display for verifying that advertisements for the intended display are displayed at the intended time at the intended display and generating verification information pertaining thereto; and,
means for receiving and storing said verification information generated by each said verification means.

31. The system of claim 30, wherein said verifying means includes a digital camera for recording the content appearing at its respective display.

32. The system of claim 30, further including a traffic count recorder means linked to each electronic display for counting amount of traffic passing an electronic display during a particular time slot and generating traffic count information for receipt and storage by said archival means.

33. The system of claim 32, further including a means for receiving said stored verification and traffic count information, analyzing said information and generating demographic information for reports to be sent to said business after their content is displayed.

34. The system of claim 33, wherein said demographic information for reports comprises information including: a time of the advertisement, the content of the advertisement, the traffic count, and residence/median income information about those who may have viewed the advertisement.

35. The system of claim 30, further including means for generating bills capable of being transmitted by phone lines to said businesses.

36. The system of claim 18, further including auction sub-system for enabling previously purchased time slots and all unsold time slots to be auctioned through a bid process.

37. The system of claim 36, wherein said auction sub-system enables the purchase of time slots for a set price, and all time not purchased at the set price becomes available through said auction sub-system at a fixed time before the run time.

38. The system of claim 18, further including means for preselecting time slots for display of the agent's content at a "best available rate" pricing for those high volume agents having establish a monthly budget to purchase a portion of the available time slots.

39. The system of claim 38, further including means for optimizing pre-selection of time slots for display of the agent's content in accordance with needs of said agent and said system.

40. A method for presenting video or still-image content at selected times and locations on a networked connection of multiple electronic displays, said method comprising:
   a) providing a network including plurality of electronic displays provided at various locations, and a plurality of point of purchase displays located at one or more places of business;
   b) enabling an agent of said business to schedule video or still-image content at selected times on selected electronic displays of said network and receiving said video or still-image content from a content provider;
   c) providing a plurality of server devices, each server device associated with a corresponding electronic display;
   d) communicating received video or still-image content to the associated server devices of corresponding selected electronic displays of said network, said associated server devices initiating display of said video or still-image content at selected times on selected electronic displays of said network; and,
   e) coordinating display of content associated with the video or still-image content presented on the selected displays at point of purchase displays at selected ones of the places of business.

41. The method of claim 40, wherein prior to placement of video or still-image advertisements at selected times on selected electronic displays, the steps of:
   enabling an agent to view a schedule of times and electronic display locations that are available for placement of advertising content; and,
   enabling an agent to purchase one or more available time slots at selected electronic display locations for placement of their content.

42. The method of claim 41, wherein prior to placement of video or still-image advertisements at selected times on selected electronic displays, the steps of:
   providing an appropriateness review of transmitted video or still image content; and
   transmitting said content to said selected electronic display upon approval of said content.

43. The method of claim 41, further comprising the step of providing said agent with Internet access for enabling remote viewing, scheduling and purchasing from remote locations.

44. The method of claim 42, wherein prior to enabling agent access to said schedule of times and available electronic display locations, the step of providing security code and billing code information for identifying said agent and authorizing agent access to said system.

45. The method of claim 44, further including providing dedicated high-speed connection to a security device for enabling high-usage agents to access the schedule of times and available electronic display locations.

46. The method of claim 44, further including the step of transmitting said content to a central processing server for receipt thereof according to a mechanism selected from the group comprising: on-line through the Internet, a direct phone line, and, a high speed information transfer line.

47. The method of claim 44, further comprising the step of formatting said still image or video advertising content according to a format selected from the group comprising: NTSC, PAL, SECAM, YUV, YC, and VGA.

48. The method of claim 42, wherein an associated server device includes one or more high speed server devices for driving said electronic displays, said content being transmitted to a server device associated with a selected display upon approval of said content to be displayed.

49. The method of claim 46, further including the step of transmitting said content to a server device associated with a selected display by a transmission means selected from the group comprising: high speed cable, a satellite link, a dedicated phone connection, a high-speed communications line, a cellular or PCS data transmission device, the Internet, a radio or radio pulse transmission device, a high speed optical fiber, and physical delivery of a medium storing said content.

50. The method of claim 49, further including the step of enabling any required reformatting of said content according to said transmission means implemented.

51. The method of claim 49, further including the steps of: verifying that advertisements for the intended display are displayed at the intended time at the intended display and generating verification information pertaining thereto; and, receiving and storing said verification information generated.

52. The method of claim 51, wherein said verifying step includes implementing a digital camera for recording the content appearing at its respective display.

53. The method of claim 51, further including the steps of:
   counting amount of traffic passing an electronic display during a particular time slot; and
   generating traffic count information for receipt and storage by an archival means.

54. The method of claim 52, further including the steps of:
   receiving said stored verification and traffic count information;
   analyzing said information; and,
   generating demographic information for reports to be sent to agents after their advertisements are displayed.

55. The method of claim 54, wherein said demographic information for reports comprises information including: a time of the advertisement, the content of the advertisement, the traffic count, and residence/median income information about those who may have viewed the advertisement.

56. The method of claim 51, further including the steps of:
   generating bills associated with purchased time slots; and,
   transmitting said bills via phone lines to an agent representing said business establishment.

57. The method of claim 51, further including the step of auctioning previously purchased time slots and all unsold time slots through a bid process.

58. The system of claim 57, wherein said auctioning step includes: enabling the purchase of time slots for a set price, and enabling all time slots not purchased at the set price to become available through said auction sub-system at a fixed time before the run time.

59. The method of claim 57, further including the step of: preselecting time slots for display of the agent's content at a "best available rate" pricing for those high volume agents having establish a monthly budget to purchase a portion of the available time slots.

* * * * *

UNITED STATES PATENT AND TRADEMARK OFFICE
CERTIFICATE OF CORRECTION

PATENT NO.   : 6,430,605 B2
DATED        : August 6, 2002
INVENTOR(S)  : Charles E. Hunter It is certified that error appears in the above-identified patent and that said Letters Patent is hereby corrected as shown below:

<u>Column 11,</u>
Line 3, after "at" delete "a".
Line 40, delete "and" and insert -- a --.
Line 42, after "placement" insert -- of --.

Signed and Sealed this

Twenty-sixth Day of November, 2002

*Attest:*

*Attesting Officer*

JAMES E. ROGAN
*Director of the United States Patent and Trademark Office*